(12) United States Patent
Takeno et al.

(10) Patent No.: US 9,433,113 B2
(45) Date of Patent: Aug. 30, 2016

(54) CHARGER

(75) Inventors: Atsuro Takeno, Wako (JP); Takashi Maruyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 414 days.

(21) Appl. No.: 13/818,783

(22) PCT Filed: Aug. 12, 2011

(86) PCT No.: PCT/JP2011/068463
§ 371 (c)(1),
(2), (4) Date: Feb. 25, 2013

(87) PCT Pub. No.: WO2012/029532
PCT Pub. Date: Mar. 8, 2012

(65) Prior Publication Data
US 2013/0148280 A1 Jun. 13, 2013

(30) Foreign Application Priority Data

Aug. 31, 2010 (JP) ................. 2010-195022

(51) Int. Cl.
*H02J 7/00* (2006.01)
*H05K 5/02* (2006.01)
*B60L 11/18* (2006.01)
*H01M 10/46* (2006.01)
*H01M 10/42* (2006.01)
*H01M 16/00* (2006.01)

(52) U.S. Cl.
CPC ............. *H05K 5/02* (2013.01); *B60L 11/1812* (2013.01); *B60L 11/1816* (2013.01); *H02J 7/0042* (2013.01); *H01M 10/4207* (2013.01); *H01M 10/46* (2013.01); *H01M 16/00* (2013.01); *H01M 2220/20* (2013.01); *Y02T 10/7005* (2013.01); *Y02T 10/7072* (2013.01); *Y02T 10/7094* (2013.01); *Y02T 90/127* (2013.01); *Y02T 90/14* (2013.01)

(58) Field of Classification Search
USPC ........................................................ 320/107
See application file for complete search history.

(56) References Cited

U.S. PATENT DOCUMENTS 6,002,235 A * 12/1999 Clore ............................ 320/105
2011/0169447 A1* 7/2011 Brown et al. .................. 320/109

FOREIGN PATENT DOCUMENTS

| JP | 55-173191 A | 5/1980 |
|---|---|---|
| JP | 55-173191 U | 12/1980 |
| JP | 59-60835 A | 4/1984 |

(Continued)

OTHER PUBLICATIONS

International Search Report and Written Opinion dated Nov. 8, 2011 corresponding to International Patent Application No. PCT/JP2011/068463.

*Primary Examiner* — Eric Lee
(74) *Attorney, Agent, or Firm* — Squire Patton Boggs (US) LLP (57) ABSTRACT

Provided is a charger, wherein capability of storing codes connected to the charger is improved. The charger is provided with: a housing case for housing therein a charger body; a wind-around recess section that is formed on the outer circumference of the housing case, and around which a first code to be connected to the charger body can be wound; and a plug recess section that is formed on the housing case, and that is for storing a plug to be connected to the front end of the first code. A housing section that is opened in the upper direction, and that houses therein a second code to be connected to the charger body, is formed on the housing case.

6 Claims, 10 Drawing Sheets

(56) References Cited

FOREIGN PATENT DOCUMENTS

| | | |
|---|---|---|
| JP | 59-60835 U | 4/1984 |
| JP | 04-097438 U | 8/1992 |
| JP | 11-321753 A | 11/1999 |
| JP | 2004-079320 A | 3/2004 |
| JP | 3142979 U | 6/2008 |

* cited by examiner

CHARGER

TECHNICAL FIELD

The present invention relates to a charger installation structure with an improved ability to store cords connected to the charger.

BACKGROUND ART

In order to improve the appearance of a charger for charging a battery of an electric vehicle, there has been disclosed a charger structure in which an AC cord and a DC cord connected to the charger extend out of a charger housing and are wound along a direction in which the cords extend (Japanese Laid-Open Patent Publication No. 2004-079320).

If a charger, which is separate from a vehicle body, is used, there is a need to store the cords of the charger in order to prevent the cords of the charger from becoming lowered in quality. According to the technique disclosed in Japanese Laid-Open Patent Publication No. 2004-079320, however, although the cords can be stored, nothing is taken into account concerning storage of plugs, etc., that are connected to distal ends of the charger cords. When the charger is placed in a storage box and is carried, the plugs, etc., tend to interfere with other objects that are housed in the storage box, and hence the ability to store the charger is poor.

An AC cord and a DC cord of chargers often are different in length. It is a troublesome task to wind AC and DC cords that are of different lengths. When AC and DC cords having different lengths are wound, the DC cord, which is shorter than the AC cord, is positioned inwardly of the AC cord. Therefore, it becomes difficult to remove the DC cord while the AC cord remains in a wound state. Also, if the AC and DC cords are wound in the same location, then they are likely to become entangled with each other.

SUMMARY OF INVENTION

The present invention has been made in view of the aforementioned difficulties. An object of the present invention is to provide a charger that improves the ability for storage of cords connected to the charger.

To accomplish the above object, there is provided a charger comprising a storage case storing a charger unit therein, a winding groove defined in an outer circumferential surface of the storage case for winding therein a first cord that is connected to the charger unit, and a plug cavity defined in the storage case for storing a plug that is connected to a distal end of the first cord, wherein the storage case includes an upwardly open storage pouch for storing a second cord that is connected to the charger unit.

According to the invention, the first cord in the charger comprises a cord for charging a battery, and the second cord comprises a power supply cord.

According to the invention, the second cord is longer than the first cord.

According to the invention, the charger further comprises a protector mounted on an upper end of the storage pouch for protecting the upper end of the storage pouch.

According to the invention, the charger further comprises a first holder disposed in an upper portion of the storage pouch for holding the second cord.

According to the invention, the charger further comprises a protector mounted on the first holder.

According to the invention, the charger further comprises a second holder disposed in an upper portion of the storage pouch for holding a plug of the second cord.

According to the invention, the charger further comprises a cap mounted on an upper portion of the storage pouch for covering an opening of the storage pouch.

According to the invention the storage pouch in the charger opens upwardly on one side of the charger along a longitudinal direction of a grip that is mounted on an upper portion of the charger, and the winding groove is defined in a lower half portion of the charger and extends circumferentially around at least a side surface of the charger.

According to the invention the charger comprises a charger for charging a battery mounted on a saddle-type electric vehicle, the plug of the first cord is connected to a charging connector that is connected to the battery, the second cord is connected to a power outlet, and when the charger charges the battery, the charger is placed on a low floor of the saddle-type electric vehicle.

According to the invention, the first cord is held in the winding groove, and the second cord is stored in the storage pouch. Therefore, the ease with which the cords are stored is increased. Since the plug of the first cord is stored in the plug cavity, the ability to store the first cord is increased, and the appearance of the charger is improved. Also, the charger itself is made compact.

According to the invention, the first cord, which is a charging cord and is thicker than the second cord that serves as a power supply cord, is simply wound in the winding groove. Therefore, the first cord can be stored with ease. Since the second cord is thinner than the first cord, the second cord can be coiled in a small ring shape and can be stored with ease.

According to the invention, since the second cord is longer than the first cord, the charger can be positioned close to a charging connector. The charger can be used with ease even if the distance to a power outlet is large.

According to the invention, since the protector is mounted on the upper end of the storage pouch, when the second cord is moved around, or is pulled over a long distance in order to reach a power outlet, for example, the upper end of the storage pouch and the second cord are prevented from becoming scratched or damaged due to abrasive contact.

According to the invention, the charger includes the first holder for holding the second cord. When the second cord is pulled over a long distance in order to reach a power outlet, for example, since the second cord is held by the first holder, the storage pouch and the second cord are prevented from becoming scratched or damaged due to abrasive contact. Furthermore, when the charger is carried by hand, the second cord is prevented from protruding from the storage pouch.

According to the invention, since the protector is mounted on the first holder, the first holder and the second cord are prevented from becoming scratched or damaged due to abrasive contact.

According to the invention, since the second holder for holding the plug of the second cord is disposed in the upper portion of the storage pouch, the second cord is prevented from protruding from the storage pouch when the charger is carried by hand.

According to the invention, since the cap for covering the opening of the storage pouch is mounted on the upper portion of the storage pouch, the second cord is prevented from protruding from the storage pouch when the charger is carried by hand.

According to the invention, inasmuch as the storage pouch opens upwardly on one side of the charger along the longitudinal direction of the grip that is mounted on the upper portion of the charger, the user can easily store the second cord in the storage pouch while carrying the charger with one hand, and without being obstructed by the first cord. Since the second cord is often left connected to a power outlet, the second cord can be stored roughly in the storage pouch. Since the winding groove is defined in the lower half portion of the charger and extends circumferentially around the side surface of the charger, the first cord can easily be tidied up and stored in the winding groove each time that the first cord is used after the charger has charged a vehicle. If the charger is placed in a low floor type of vehicle, which is higher than the ground, the first cord can be removed and wound easily since the user is not required to bend deeply.

According to the invention, since the charger is placed in a low floor type of vehicle, the charger and the vehicle can remain connected together reliably. Also, compared to placing the charger on the ground, the user can remove and wind the first cord with greater ease and without having to bend deeply.

The above and other objects, features, and advantages of the present invention will become more apparent from the following description when taken in conjunction with the accompanying drawings in which preferred embodiments of the present invention are shown by way of illustrative example.

DESCRIPTION OF EMBODIMENTS

Chargers according to preferred embodiments of the present invention will be described in detail below with reference to the accompanying drawings.

Figure 1:
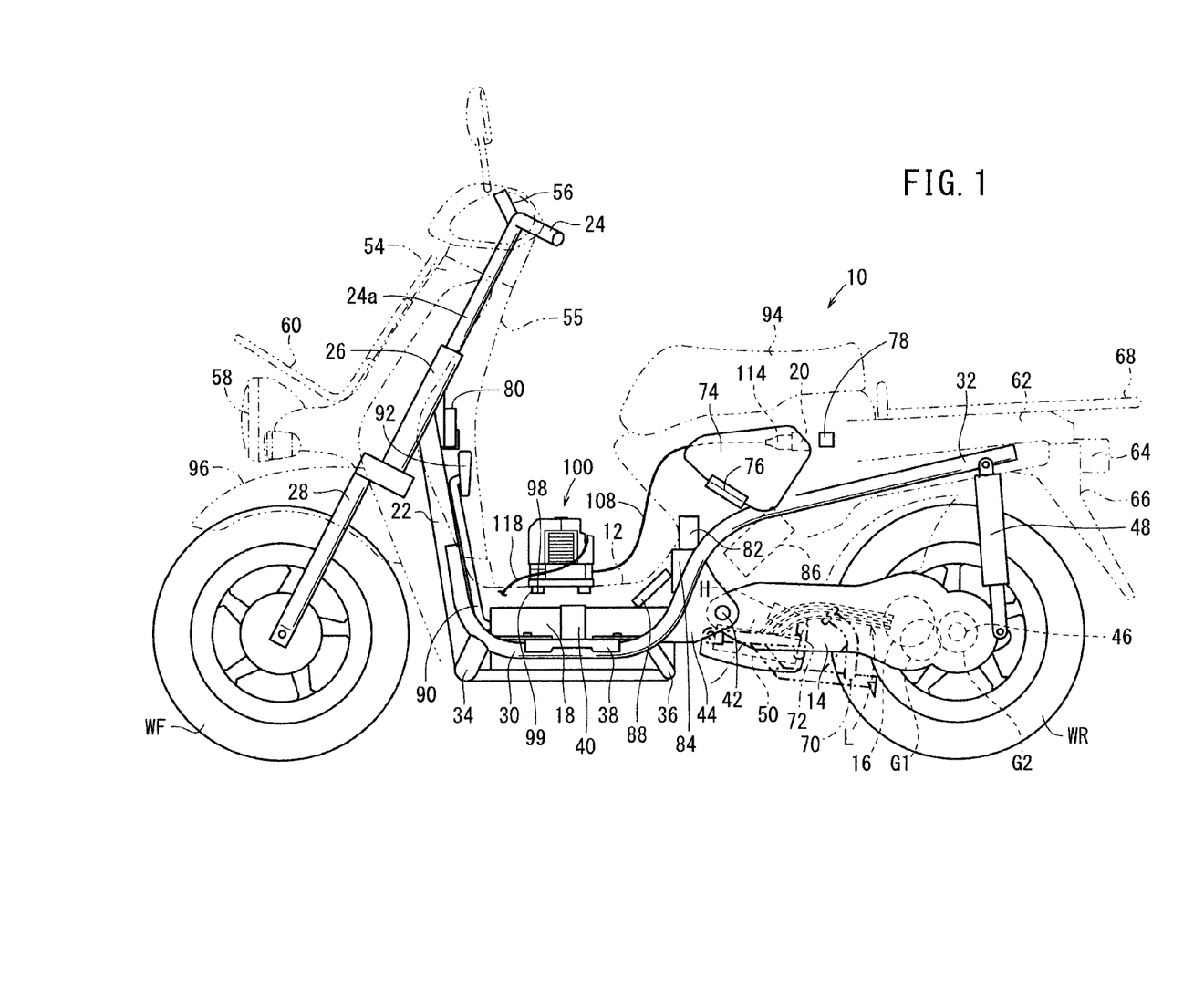
FIG. 1 is a side elevational view showing a central structure of an electric two-wheeled vehicle according to an embodiment of the present invention.

FIG. 1 is a side elevational view showing a central structure of an electric two-wheeled vehicle (saddle-type electric vehicle) 10 according to an embodiment of the present invention. The electric two-wheeled vehicle 10 includes a step floor (low floor) 12 as part of a vehicle cover. The electric two-wheeled vehicle 10 has a rear wheel WR driven by rotational drive power from an electric motor (motor) 16 mounted on a swing arm 14. The electric motor 16 is supplied with electric power from a main battery (battery) 18, which is disposed beneath the step floor 12. The main battery 18 is charged by a charger 100, which is connected to a charging connector 20 disposed in the vehicle body.

A head pipe 26, by which a steering system 24a is rotatably supported, is connected to the upper end of a main frame 22. A front wheel WF is rotatably supported by a front fork 28, which includes a pair of left and right fork members, and which is joined to the steering system 24a. The front wheel WF can be steered by a pair of left and right handles 24 mounted on an upper portion of the steering system 24a.

Two left and right side frames 30 have respective upper ends coupled to a substantially vertical central portion of the main frame 22. The side frames 30 extend obliquely downward from the coupled upper ends, and are bent and extend horizontally. The main battery 18, which is a 72-volt battery, for example, for supplying electric power to the electric motor 16, is disposed between horizontal portions of the left and right side frames 30. The left and right side frames 30 rise obliquely rearward from the horizontal portions of the left and right side frames 30, are bent upwardly of the vehicle body, and are coupled to a rear frame 32.

A lower cross front frame 34 is connected between front portions of the side frames 30, and a lower cross rear frame 36 is connected between rear portions of the side frames 30. The main frame 22 has a lower end coupled to a central portion of the lower cross front frame 34. The main battery 18 is disposed between the lower cross front frame 34 and the lower cross rear frame 36. Since the main battery 18 is surrounded by the left and right side frames 30, the lower cross front frame 34, and the lower cross rear frame 36, the main battery 18 is firmly secured to the vehicle body.

Side brackets 38 are mounted respectively on each of the side frames 30. The main battery 18, which is disposed on the side brackets 38, is secured in place by a securing plate 40 that is mounted on the side brackets 38.

Pivot plates 44 with a swing arm pivot 42 mounted thereon are attached to a rear portion of the side frames 30. The swing arm 14, which is disposed on the left side of the vehicle body and serves as a cantilevered arm for supporting the rear wheel WR, has a front end, which is swingably supported on the swing arm pivot 42. The rear wheel WR is rotatably supported by an axle 46 on a rear portion of the swing arm 14. A rear end of the swing arm 14 is suspended from the rear frame 32 by a rear shock absorber unit 48.

A power drive unit 50 is mounted on a lower portion of the swing arm 14. The power drive unit 50 converts direct current supplied from the main battery 18 into an alternating current, and supplies the alternating current to the electric motor 16. The power drive unit 50 supplies electric power to the electric motor 16 through cables L. The electric motor 16 transmits drive power to the axle 46, and thereafter to the rear wheel WR, successively through a first speed reduction gear G1 and a second speed reduction gear G2. Reference character H indicates a smoothing capacitor.

The vehicle cover, which covers the electric two-wheeled vehicle 10, includes a front cover 54, which is disposed in front of the handles 24. A meter unit 56 including a speedometer is mounted on an upper portion of the front cover 54. A head lamp 58 and a front luggage carrier 60 are mounted on a front side of the front cover 54. The vehicle cover also includes a leg shield 55, which is disposed behind the head pipe 26 contiguous to the front cover 54. The leg shield 55 covers front portions of the legs of a rider seated on a seat 94.

A front fender 96 is disposed above the front wheel WF. The step floor 12, on which the rider's feet are placed, is disposed above the main battery 18. The vehicle cover includes a seat cover 62, which is disposed outside of the rear frame 32. The seat 94 is disposed above the seat cover 62. A tail lamp 64, a rear fender 66, and a rear luggage carrier 68 are mounted on a rear end portion of the seat cover 62.

A central stand 70 having two legs, which are spaced from each other in a transverse direction of the electric two-wheeled vehicle 10, is mounted on the pivot plates 44. A side stand 72 is attached to one of the pivot plates 44. On the illustrated electric two-wheeled vehicle 10, which is designed for use in Japan, the side stand 72 is disposed on the left side of the vehicle body.

A charging lid 74 is openably and closably mounted on a side of the seat cover 62 where the side stand 72 is positioned. The charging lid 74 is openable and closable about a hinge 76. An opening and closing button 78 is used to open the charging lid 74. When the opening and closing button 78 is pressed, the charging lid 74 is opened, thereby exposing the charging connector 20. The charging connector 20 is disposed on the same side of the vehicle body where the side stand 72 is positioned. A plug 114, which is provided on the distal end of a first cord 108 of a later-described charger 100, can be connected to the charging connector 20. The charging lid 74 includes a non-illustrated recess defined therein for preventing the charging lid 74 and the first cord 108 from interfering with each other, thereby allowing the charging lid 74 to become fully closed during times that the plug 114 is connected to the charging connector 20, i.e., while the main battery 18 is being charged.

A 12-volt auxiliary battery 80, which supplies electric power to an ECU (not shown) that controls accessories including the head lamp 58, etc., and the electric motor 16 through the power drive unit 50, is disposed on the right side of the head pipe 26 in the transverse direction of the electric two-wheeled vehicle 10. The auxiliary battery 80 is charged using electric power supplied from the main battery 18. Within the seat cover 62 and behind the main battery 18, there are disposed a DC-DC converter 82 for converting a 72-volt voltage from the main battery 18 into a 14.5-volt voltage, and a contactor box 84 that houses fuses and relays. Although in the present embodiment the electric two-wheeled vehicle 10 includes the auxiliary battery 80, the auxiliary battery 80 may be dispensed with.

The main battery 18 has an opening defined in a rear portion thereof, with a sirocco fan 88 disposed over the opening. The main battery 18 also includes an opening defined in a front portion thereof, which is connected to an upwardly extending intake pipe 90. An upper end of the intake pipe 90 is connected to an air cleaner 92, which is disposed above the step floor 12. The intake pipe 90 and the air cleaner 92 are housed in the front cover 54, whereas the sirocco fan 88 is housed in the seat cover 62. An ambient air inlet of the air cleaner 92 is disposed on the leg shield 55. The air cleaner 92 allows ambient air to be introduced through the intake pipe 90 into the main battery 18. The sirocco fan 88 discharges air to the atmosphere from the main battery 18, thereby dissipating heat generated in the main battery 18 to the atmosphere.

The step floor 12 includes multiple cavities (e.g., four cavities) 98 defined therein. The charger 100 includes plural teeth (e.g., four teeth) 99 defined on a bottom surface thereof, which are fitted respectively into the cavities 98. During a time that the main battery 18 is charged, the teeth 99, which are defined in the bottom surface of the charger 100, are fitted respectively into the cavities 98 of the step floor 12, thereby enabling the charger 100 to be placed securely on the step floor 12.

Figure 2:
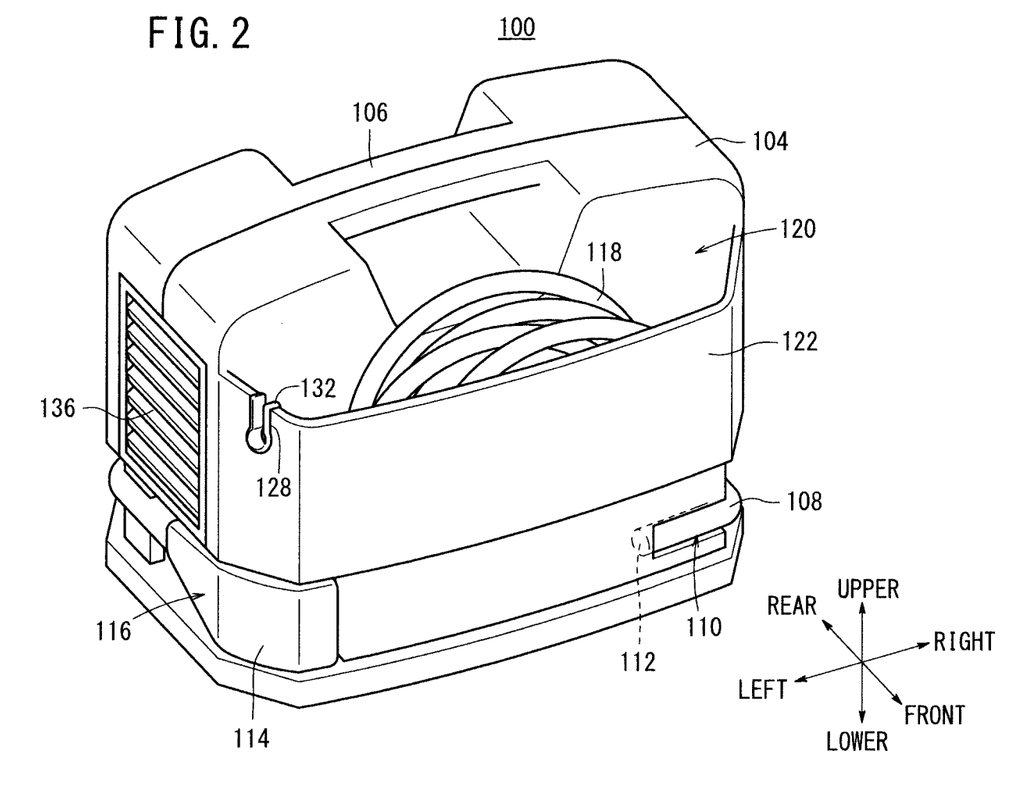
FIG. 2 is a perspective view of a charger according to the embodiment, showing the charger when in storage.
Figure 3:
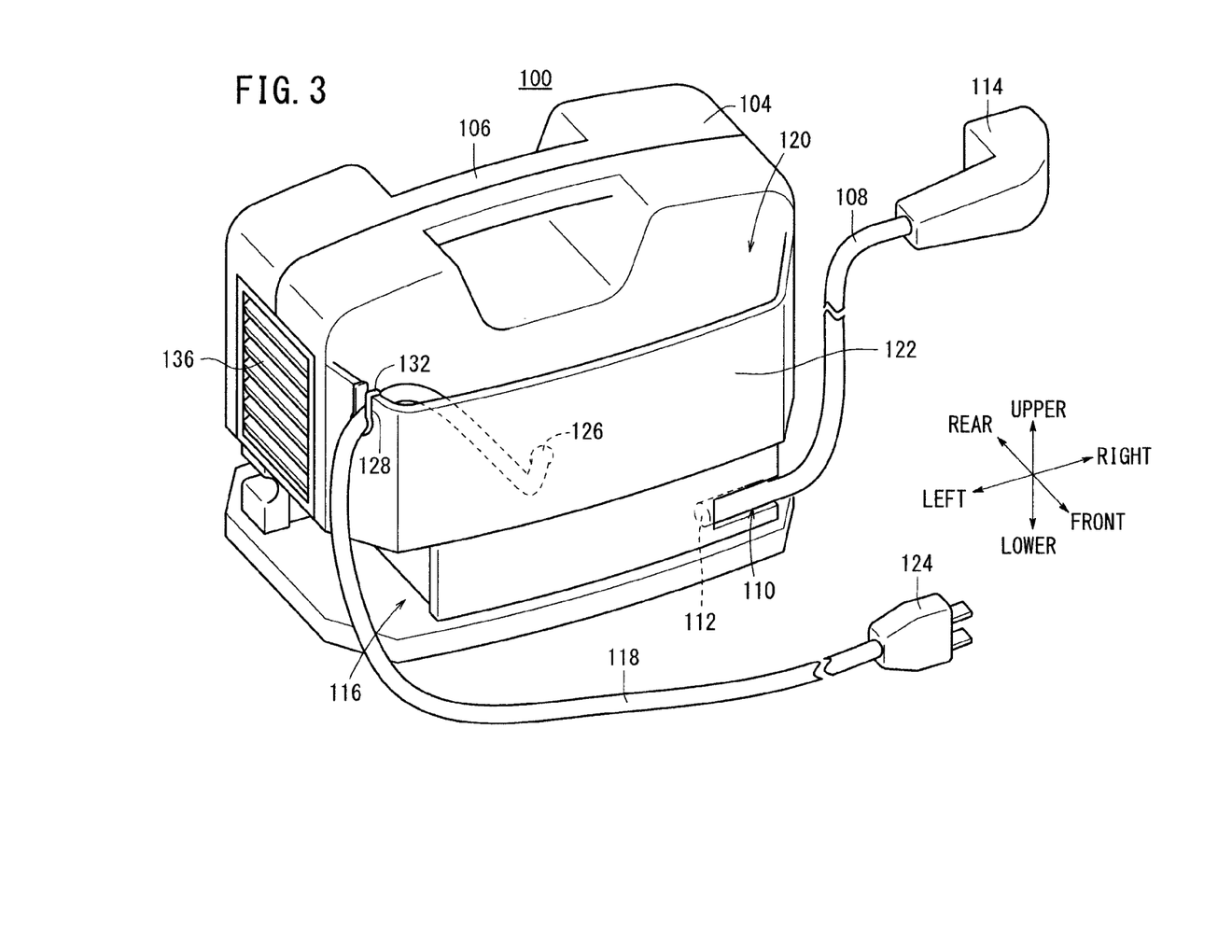
FIG. 3 is a perspective view of a charger according to the embodiment, showing the charger when in use.
Figure 4:
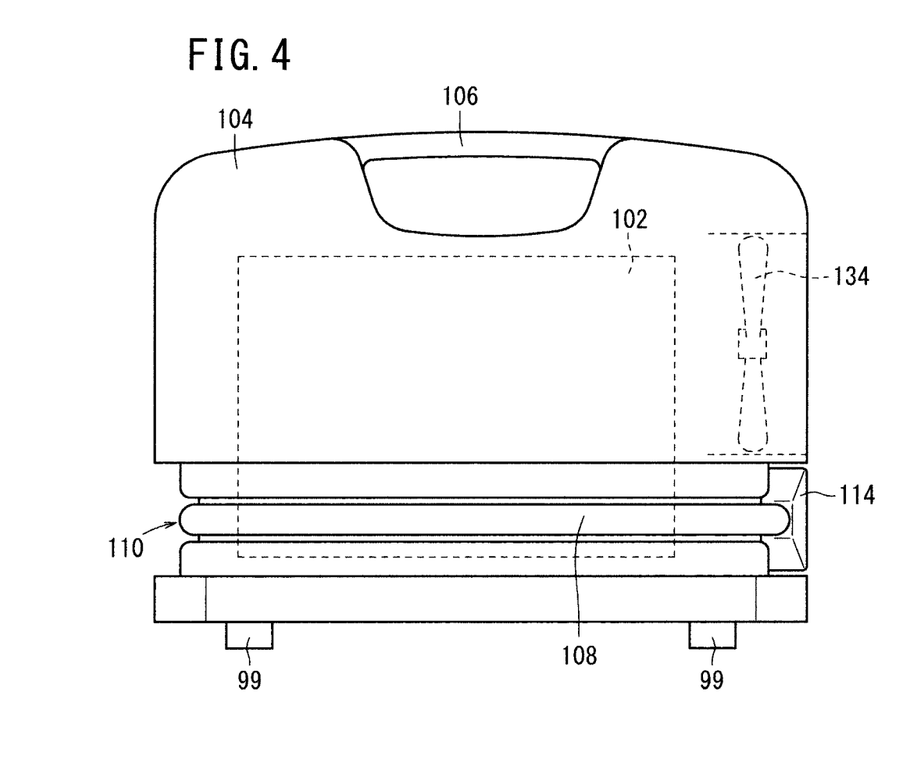
FIG. 4 is a rear elevational view of the charger shown in FIG. 1.
Figure 5:
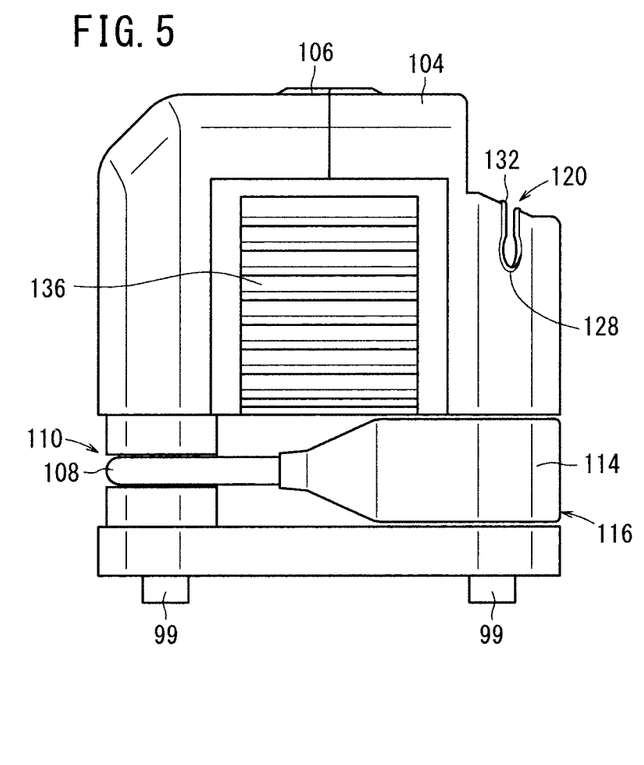
FIG. 5 is a side elevational view of the charger shown in FIG. 1.

FIGS. 2 and 3 are perspective views of the charger 100 shown in FIG. 1. FIG. 4 is a rear elevational view of the charger 100 shown in FIG. 1. FIG. 5 is a side elevational view of the charger 100 shown in FIG. 1. FIG. 2 shows the charger 100 when in storage, whereas FIG. 3 shows the charger 100 when in use. For facilitating understanding of the invention, the directions indicated by the arrows in FIG. 2 will be referred to as front and rear, left and right, and upper and lower directions in FIGS. 2 through 4. In FIG. 5, a second cord 118 is omitted from illustration.

The charger 100 includes a storage case 104 in which a charger unit 102 (see FIG. 4) is stored. The storage case 104 has a grip 106 on an upper portion thereof, and a winding groove 110 defined in an outer circumferential surface thereof for enabling the first cord 108, which is connected to the charger unit 102, to be wound therein. The winding groove 110 is defined in a lower half portion of the storage case 104 and extends circumferentially around the side surface of the storage case 104. A first hole 112 is defined in the storage case 104 and opens into the winding groove 110. The first cord 108, which is connected to the charger unit 102 that is housed in the storage case 104, extends from the first hole 112 and outside of the storage case 104. Since the first cord 108 extends from the first hole 112, which opens in the winding groove 110, the first cord 108 can easily be wound in the winding groove 110. Therefore, the first cord 108 can be placed neatly in the winding groove 110 and thus the ability to store the first cord 108 is improved.

The plug 114, which can be connected to the charging connector 20 on the vehicle body that is connected to the main battery 18, is mounted on the distal end of the first cord 108. The storage case 104 includes a plug recess 116 defined therein for enabling storage of the plug 114. The first cord 108 is a cord for charging the main battery 18. The plug recess 116 is disposed at a position corresponding to the position of the plug 114, such that the plug 114 is placed in the plug recess after the first cord 108 has been wound in the winding groove 110. Therefore, when the plug 114 is stored in the plug recess 116 after the first cord 108 has been wound in the winding groove 110, loosening of the first cord 108 is prevented. Consequently, the first cord 108 can be stored neatly and compactly. Since the plug 114 is stored in the plug recess 116 when the charger 100 is stored in a storage box or the like and is carried around, the plug 114 is prevented from interfering with other objects that are stored in the storage box or the like.

The storage case 104 has an upwardly open storage pouch 120 defined in a front side thereof for enabling storage of a second cord 118, which serves as a 100-volt AC power supply cord and is connected to the charger unit 102. The storage pouch 120 opens upwardly on one side of the charger 100 along the longitudinal direction of the grip 106. The second cord 118 is thinner and longer than the first cord 108. The storage pouch 120 is formed by a storage cover 122 and the storage case 104. Ends (lower and side ends) of the storage cover 122, except for the upper end thereof, are joined to the storage case 104. A plug 124 for connection to a power outlet is disposed on the distal end of the second cord 118. A second hole 126 is defined at the bottom of the storage pouch 120 in a portion of the storage case 104 that is covered with the storage cover 122. In other words, the second hole 126 is disposed in the storage pouch 120. The second cord 118, which is connected to the charger unit 102, extends from the second hole 126 and outside of the storage case 104. Since the second cord 118 extends from the second hole 126 in the storage pouch 120 and outside of the storage case 104, the user can easily store the second cord 118 in the storage pouch 120. If the second cord 118 is coiled in a ring shape, then the second cord 118 can be stored neatly in the storage pouch 120.

The storage pouch 120 includes a first holder 128 on an upper end thereof, i.e., on the upper end of the storage cover 122, for holding the second cord 118. The first holder 128 is in the form of a slot and has an inlet portion, which is narrower than a deep portion of the first holder 128. Therefore, the first holder 128 can hold the second cord 118 without allowing the second cord 118 to become dislodged easily from the first holder 128. The first holder 128 includes a protector 132 for protecting the first holder 128. The protector 132 is made of an elastic material such as a resin material or the like. The protector 132 protects the first holder 128 and the second cord 118, thus enhancing durability and protecting against scratching and damage, which would otherwise be caused by abrasive contact between the first holder 128 and the second cord 118. Therefore, the protector 132 is disposed in a location where the first holder 128 would come into contact with the second cord 118 when the second cord 118 is held by the first holder 128.

As shown in FIGS. 1 and 3, when the charger 100 is in use, the charging lid 74 of the electric two-wheeled vehicle 10 is opened, and the plug 114 of the first cord 108 is removed from the plug recess 116 and is connected to the charging connector 20. The second cord 118 is removed from the storage pouch 120, and the plug 124 thereof is inserted into a non-illustrated power outlet.

At this time, inasmuch as the second cord 118 is pulled in order to reach the power outlet, the second cord 118 and the upper end of the storage pouch 120 tend to rub against each other. If the second cord 118 is pulled strongly, then the junction between the second cord 118 and the charger unit 102 is subjected to stress, leading to the possibility that the second cord 118 will become dislodged from the charger unit 102. To alleviate such difficulties, the second cord 118 is held by the first holder 128, or stated otherwise, the second cord 118 is fitted into the slot, which serves as the first holder 128, so that the second cord 118 and the upper end of the storage pouch 120 do not rub against each other, thereby reducing stresses that are applied at the junction between the second cord 118 and the charger unit 102 when the second cord 118 is pulled. Therefore, the durability of the end of the storage pouch 120 and the second cord 118 is increased, together with enhancing the durability of the charger 100.

The storage case 104 has a cooling fan 134 disposed on a left side of the charger unit 102 for cooling the charger unit 102. The storage case 104 also has a discharge port 136 defined in a left wall thereof for discharging a stream of air from the cooling fan 134 out of the storage case 104, and an inlet port (not shown), which is defined in a right wall of the storage case 104 for introducing ambient air into the storage case 104. The discharge port 136 and the inlet port are positioned above the winding groove 110.

As described above, the charger 100 according to the above embodiment includes the winding groove 110, which is defined in the outer circumferential surface of the storage case 104 for enabling winding of the first cord 108, and the plug recess 116, which is defined in the storage case 104 for enabling storage of the plug 114 that is connected to the distal end of the first cord 108. Therefore, the charger 100, with the first cord 108 wound thereon, has a smart and pleasing appearance, and the charger 100 per se is made compact. Since the storage case 104 includes the storage pouch 120 for enabling storage of the second cord 118, the second cord 118, which is lengthy, can easily be stored in place, thereby making the appearance of the charger 100 aesthetically pleasing.

The above embodiment may be modified in the following ways.

(Modification 1)

Figure 6:
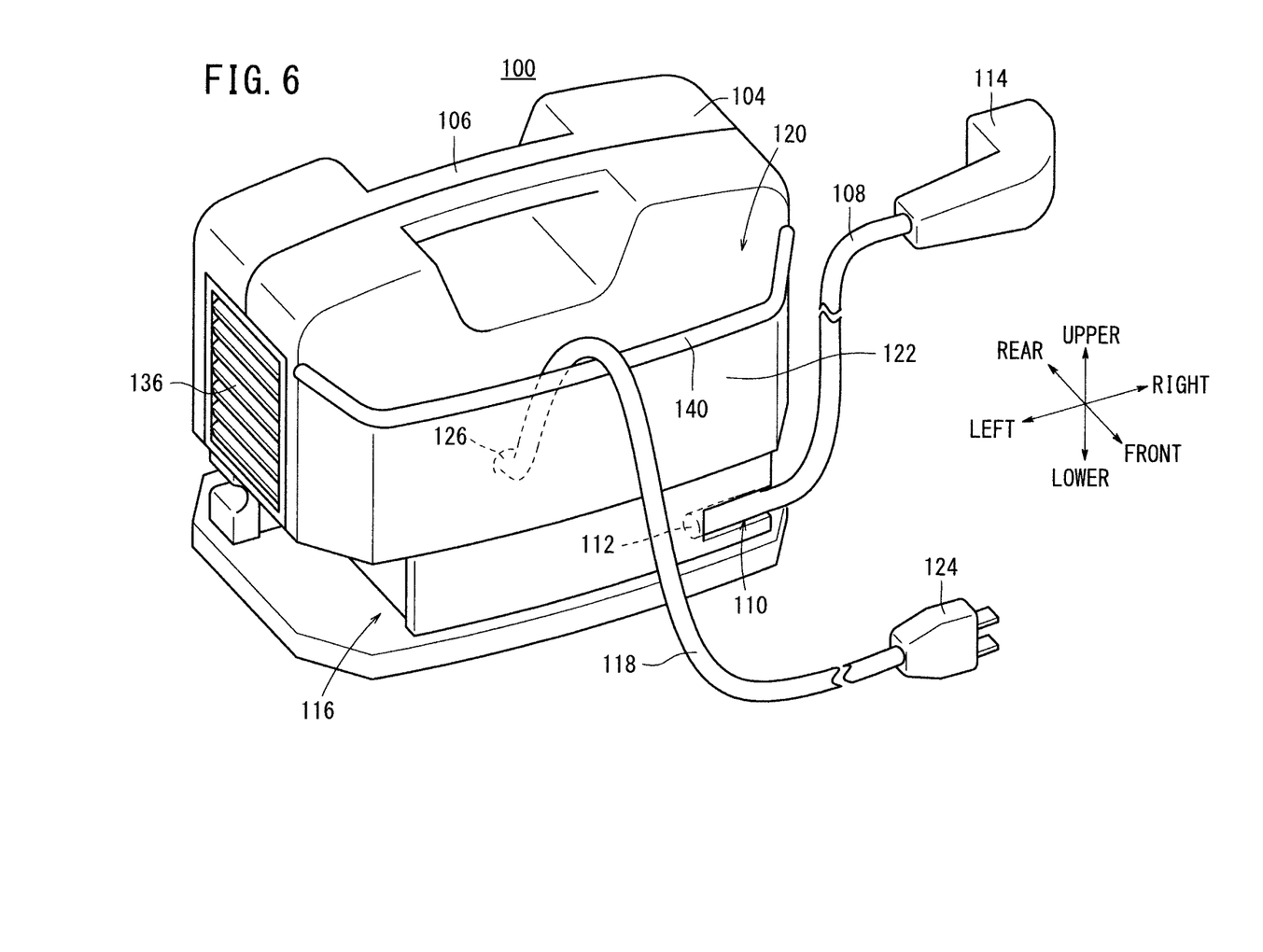
FIG. 6 is a perspective view of a charger according to Modification 1.

Although it has been described above that the first holder 128 for holding the second cord 118 is disposed in the upper portion of the storage pouch 120, the first holder 128 may be dispensed with. If the first holder 128 is dispensed with, then in order to prevent the second cord 118 and the storage cover 122 from becoming scratched or damaged due to frictional engagement between the second cord 118 and the upper end of the storage cover 122, as shown in FIG. 6, a protector 140 for protecting the upper end of the storage cover 122 is mounted on the upper end of the storage pouch 120, i.e., the upper end of the storage cover 122. The protector 140 is made of an elastic material such as a resin material or the like. Further, even if the first holder 128 is not dispensed with, the protector 140 may still be mounted on the upper end of the storage cover 122.

(Modification 2)

Figure 7:
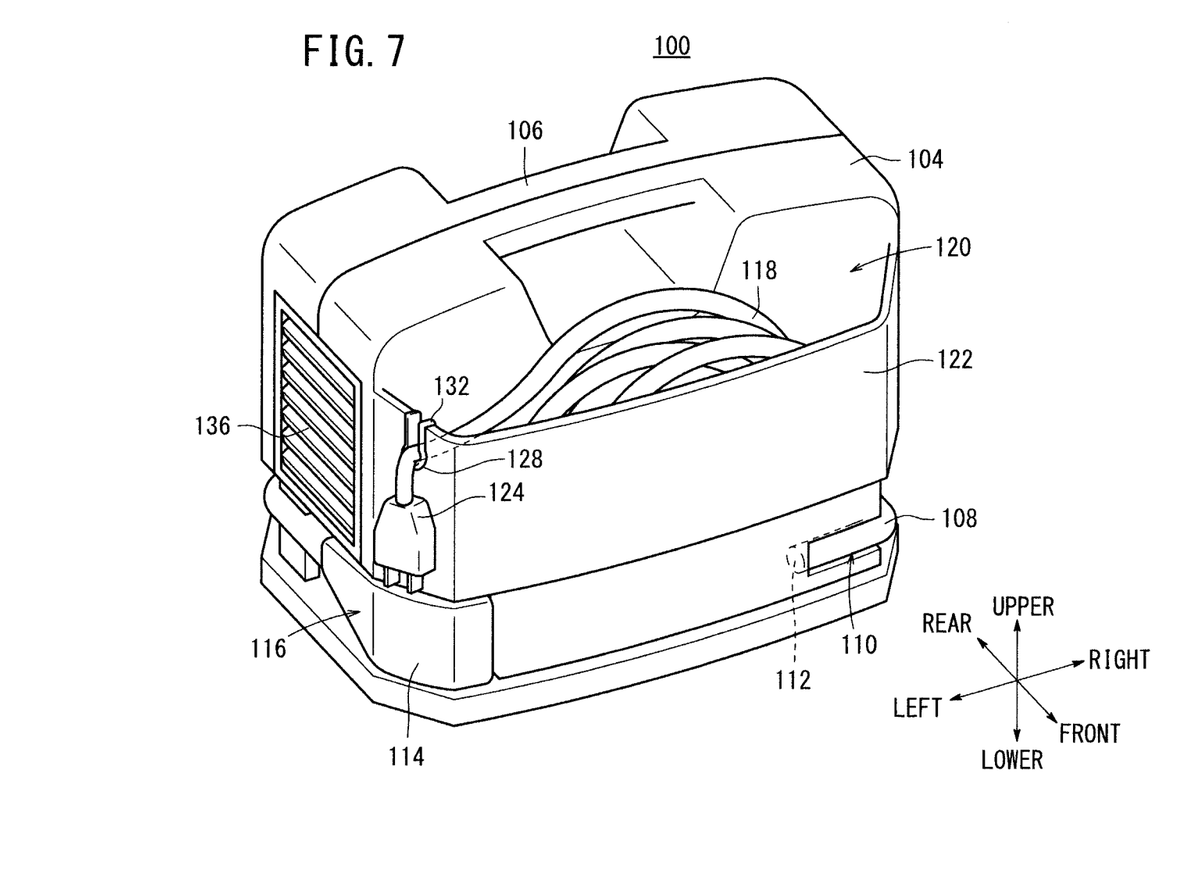
FIG. 7 is a perspective view of a charger according to Modification 2, showing the charger when in storage.

In the above embodiment and in Modification 1, the first holder 128 serves to hold the second cord 118 during times that the charger 100 is in use. However, as shown in FIG. 7, the first holder 128 may be used to hold the second cord 118, which is stored in the storage pouch 120, during times that the charger 100 is not in use. Consequently, the second cord 118 can be prevented from protruding from the storage pouch 120 when the charger 100 is carried by hand.

(Modification 3)

Figure 8:
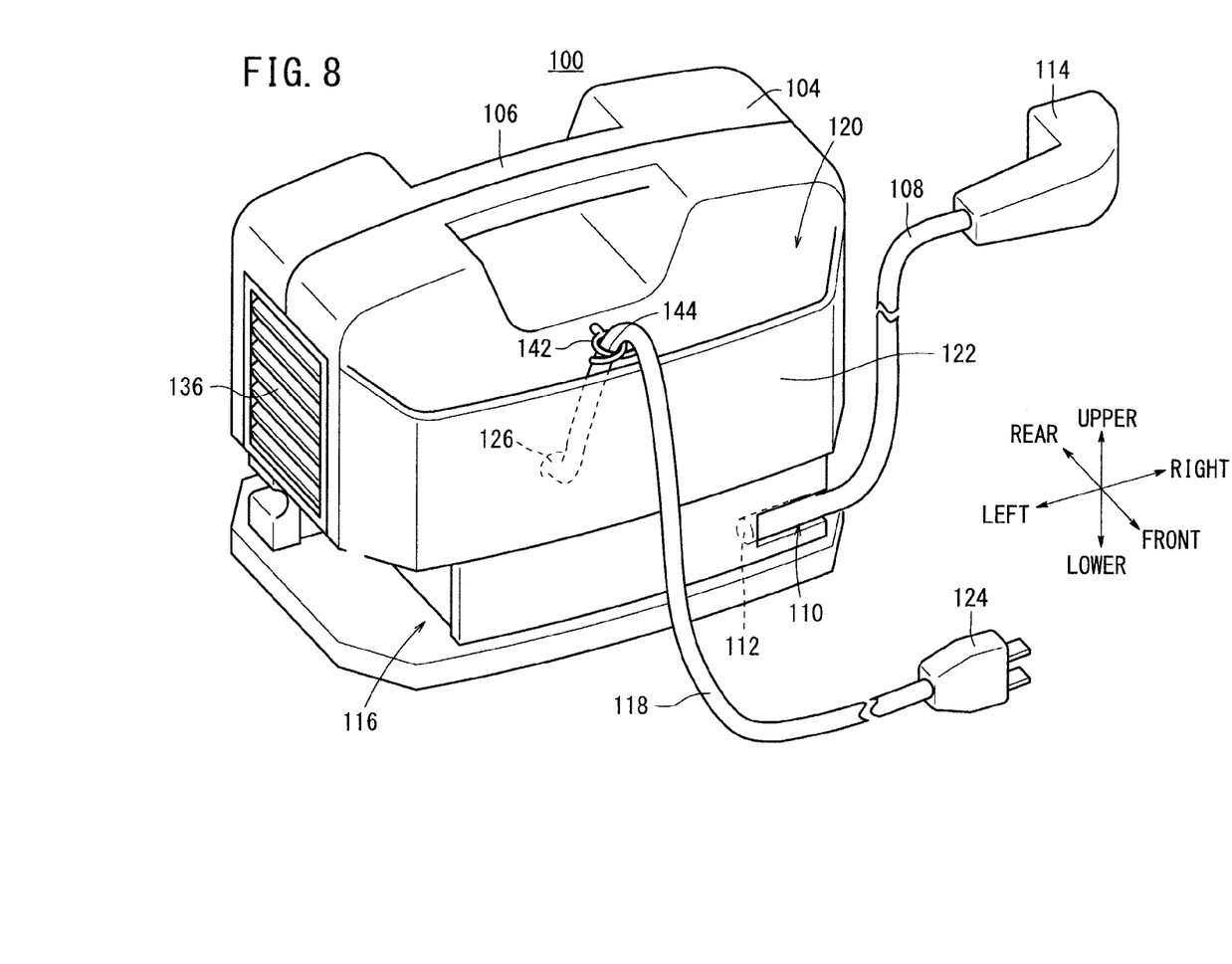
FIG. 8 is a perspective view of a charger according to Modification 3.

In the above embodiment and in Modifications 1 and 2, the first holder 128 is in the form of a slot, which is defined in the upper end of the storage cover 120. However, as shown in FIG. 8, a first holder 142 may be disposed in an upper portion of the storage pouch 120 at a location separate from the storage cover 122. In this case, the first holder 142 is in the form of a clip for holding the second cord 118 by clamping the second cord 118. When the first holder 142 holds the second cord 118 in this manner, the second cord 118 and the upper end of the storage pouch 120 do not rub against each other during times that the charger 100 is in use, and thus the second cord 118 and the storage pouch 120 are of increased durability.

The first holder 142 may also include an elastic protector 144 for protecting the first holder 142. The protector 144 is effective to prevent the first holder 142 and the second cord 118 from coming into contact with each other, thereby enhancing durability and preventing scratching and damage, which would otherwise be caused by abrasive contact between the first holder 142 and the second cord 118. The protector 144 is disposed in a location where the first holder 142 would otherwise come into contact with the second cord 118 when the first holder 142 holds the second cord 118.

In FIG. 8, the first holder 142 is disposed on the storage case 104. However, the first holder 142 may be disposed on the storage cover 122. Further, the first holder 142, which is disposed on the storage cover 122, may include an elastic protector 144 for protecting the first holder 142. Similar to Modification 2, the first holder 142 may be used to hold the second cord 118, which is stored in the storage pouch 120 when the charger 100 is not in use. A protector 140 may also be mounted on the upper end of the storage cover 122.

(Modification 4)

Figure 9:
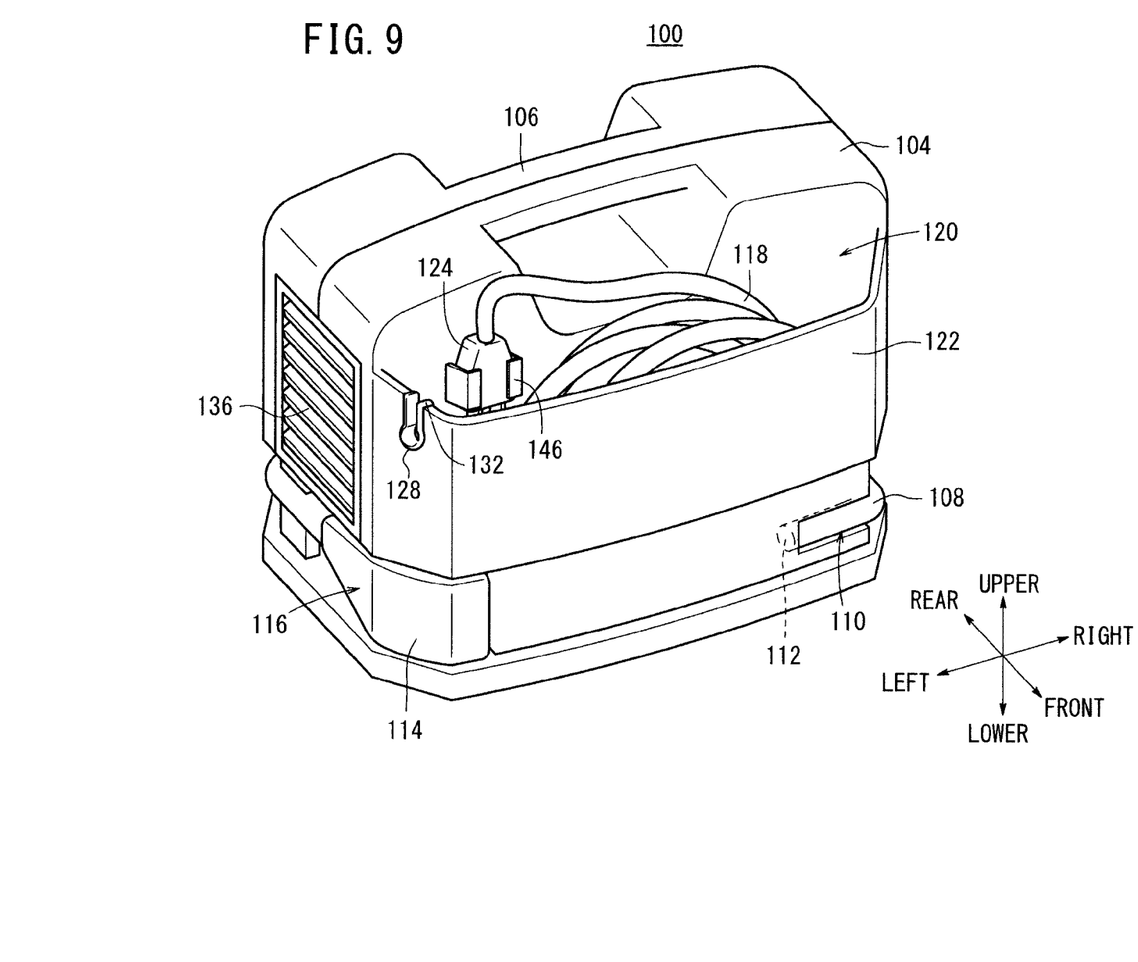
FIG. 9 is a perspective view of a charger according to Modification 4, showing the charger when in storage.

According to Modification 4, as shown in FIG. 9, a second holder 146 for holding the plug 124 of the second cord 118 is disposed in an upper portion of the storage pouch 120. The second holder 146 holds the plug 124 by sandwiching transverse opposite sides of the plug 124. Alternatively, the second holder 146 may hold the plug 124 by supporting a lower end of the plug 124. The second holder 146 is effective to prevent the second cord 118 from protruding from the storage pouch 120 when the charger 100 is carried by hand.

(Modification 5)

Figure 10:
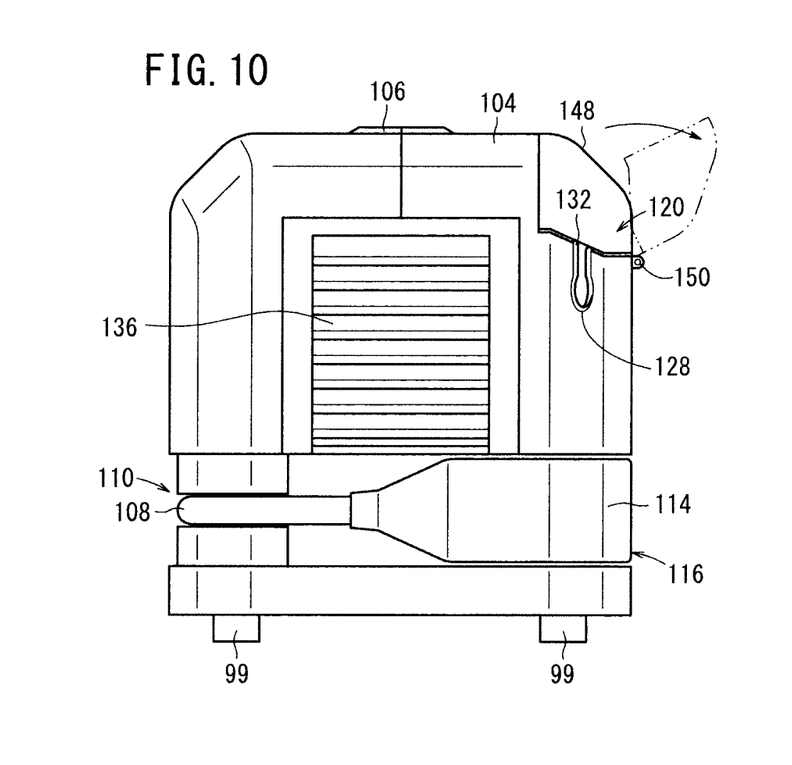
FIG. 10 is a side elevational view of a charger according to Modification 5.

As shown in FIG. 10, according to Modification 5, a cap 148 is disposed on an upper portion of the storage pouch 120 for covering the storage pouch 120. The cap 148 is angularly movably connected by a hinge 150 to the upper end of the storage pouch 120, or stated otherwise, to the upper end of the storage cover 122. After the second cord 118 has been stored in the storage pouch 120, the cap 148 covers the upper opening of the storage pouch 120. Therefore, the second cord 118 is prevented from protruding from the storage pouch 120 when the charger 100 is carried by hand.

(Modification 6)

The charger 100 may be of a configuration based on any one of various combinations of Modifications 1 through 5.

The present invention has been described above with respect to preferred embodiments thereof. However, the technical scope of the present invention is not limited to the scope of the above-disclosed embodiments. It is obvious to those skilled in the art that various many modifications or improvements can be made with respect to the above embodiments. It is apparent that configurations, which are based on such modifications or improvements, will fall within the technical scope of the present invention. The reference characters shown in parentheses, which are referred to in the appended patent claims, have been added corresponding to the reference characters shown in the accompanying drawings, for thereby facilitating understanding of the present invention. However, the present invention should not be construed as being limited to the elements denoted by such reference characters.

The invention claimed is:

1. A charger comprising:
a storage case storing a charger unit therein;
a winding groove defined in an outer circumferential surface of the storage case for winding therein a first cord that is connected to the charger unit;
a plug recess defined in the storage case for storing a plug that is connected to a distal end of the first cord,
wherein the storage case includes an upwardly open storage pouch that is formed by the storage case and a storage cover that is joined to the storage case, wherein the storage pouch stores a second cord that is connected to the charger unit,
the first cord comprises a cord for charging a battery,
the second cord comprises a power supply cord, which is thinner and longer than the first cord, and
the storage pouch opens upwardly on one side of the charger along a longitudinal direction of a grip mounted on an upper portion of the charger, and the winding groove is defined in a lower half portion of the charger and extends circumferentially around at least a side surface of the charger,
the second cord extends from the charger unit to outside of the storage pouch via a hole formed through the storage case in the storage pouch; and
a protector having a shape extending along an upper end of the storage cover and being made of resin material for protecting the upper end of the storage cover to reduce scratching caused by abrasive contact between the upper end of the storage cover and the second cord.

2. The charger according to claim 1, further comprising: a first holder disposed in an upper portion of the storage pouch for holding the second cord.

3. The charger according to claim 2, further comprising: a protector mounted on the first holder.

4. The charger according to claim 1, further comprising: a second holder disposed in an upper portion of the storage pouch for holding a plug of the second cord.

5. The charger according to claim 1, further comprising: a cap mounted on an upper portion of the storage pouch for covering an opening of the storage pouch.

6. The charger according to claim 1, wherein the charger comprises a charger for charging a battery mounted on a saddle-type electric vehicle, the plug of the first cord is connected to a charging connector that is connected to the battery, the second cord is connected to a power outlet, and when the charger charges the battery, the charger is placed on a low floor of the saddle-type electric vehicle.

* * * * *